United States Patent [19]

Ashkin et al.

[11] Patent Number: 4,606,605

[45] Date of Patent: Aug. 19, 1986

[54] OPTICAL FIBER HAVING IN-LINE POLARIZATION FILTER

[75] Inventors: Arthur Ashkin; Rogers H. Stolen, both of Rumson, N.J.

[73] Assignee: AT&T Bell Laboratories, Murray Hill, N.J.

[21] Appl. No.: 626,064

[22] Filed: Jun. 29, 1984

[51] Int. Cl.⁴ .............................................. G02B 6/18
[52] U.S. Cl. ............................... 350/96.31; 350/96.30
[58] Field of Search ............ 350/96.11, 96.15, 96.30, 350/96.31; 372/96

[56] References Cited

U.S. PATENT DOCUMENTS

| | | | |
|---|---|---|---|
| 3,666,348 | 5/1972 | Marcatili | 350/96.15 |
| 4,053,205 | 10/1977 | Miller | 350/96.31 |
| 4,161,702 | 7/1979 | Kessler et al. | 372/96 |
| 4,176,911 | 12/1979 | Marcatili et al. | 350/96.31 |
| 4,179,187 | 12/1979 | Maurer | 350/96.31 |
| 4,212,660 | 7/1980 | Maurer | 350/96.31 |
| 4,257,011 | 3/1981 | Nakamura et al. | 372/96 |
| 4,416,013 | 11/1983 | Tobin | 372/96 |
| 4,506,367 | 3/1985 | Akiba et al. | 372/96 |

FOREIGN PATENT DOCUMENTS 2002535  2/1979  United Kingdom ............. 350/96.31

OTHER PUBLICATIONS

Kitayama et al., "Polarisation-Maintaining Single-Mode Fiber with Azimuthally Inhomogeneous Index Profile"; *Electronics Letters;* vol. 17, No. 12; Jun. 1981, pp. 419–420.

*Primary Examiner*—William L. Sikes
*Assistant Examiner*—Robert E. Wise
*Attorney, Agent, or Firm*—Richard D. Laumann

[57] ABSTRACT

A device using a birefringent optical fiber having periodic integral perturbations with the period equal to the birefringence beat length being useful as, for example, a polarization rotator and an optical filter.

20 Claims, 7 Drawing Figures

OPTICAL FIBER HAVING IN-LINE POLARIZATION FILTER

TECHNICAL FIELD

This invention relates generally to optical devices and particularly to such devices as optical fibers having optical filters formed as an integral part of the optical fiber.

BACKGROUND OF THE INVENTION

Optical fibers are of interest for optical communications systems as well as for other applications such as interferometric sensors. Optical fibers typically comprise a high refractive index core which is surrounded by a low refractive index cladding. The essential components of an optical communications system as presently contemplated are a light source and a photodetector optically coupled to each other by means of the optical fiber. The highest capacity optical communications systems will be obtained with use of single mode optical fibers. It is readily understood by those skilled in the art that although optical fibers are referred to as single mode fibers, they are in reality capable of supporting two modes having orthogonal polarizations.

Other types of optical devices in addition to those just mentioned also promise to be useful in optical communications systems. For example, polarization converters are optical devices which change the state of polarization of a propagating electromagnetic wave. Such devices may be used in optical communications systems as optical modulators or as wavelength selective components if the polarization conversion efficiency is wavelength dependent. Because of the versatility and usefulness of such devices, they promise to be of great importance in single mode optical communications systems. As such, much effort has been devoted to developing efficient polarization converters and wavelength selective components.

Wavelength selective filters have been known for some time. For example, a Lyot filter comprises a plurality of birefringent wave plates. Each plate is positioned between parallel linear polarizers and has twice the retardation of the previous polarizer. Another type of filter is a Solc filter which has a plurality of half wave plates with the fast axis of each plate rotated about the optic axis by a specified angle which varies from plate to plate in a specified manner. Embodiments of Lyot and Solc filters using bulk optics are typically unwieldy, i.e., require a lot of space, and are not expediently fabricated for communications systems.

Another approach to developing a polarization converter, which is also a wavelength selective filter, uses integrated optics. One integrated optics approach is described in *Applied Physics Letters*, 36, pp. 513–515, Apr. 1, 1980. This article describes an efficient planar waveguide electro-optic TE-TM mode converter and wavelength filter. In the particular embodiment of the mode converter described in detail, wavelength selective polarization conversion is achieved using a strip Ti diffused lithium niobate waveguide. Efficient coupling between the transverse electric and magnetic modes was obtained by using periodic finger electrodes to yield the desired phase matching between the TE and TM modes. The strongly wavelength dependent nature of the polarization conversion resulting from the highly birefringent nature of lithium niobate makes the device useful in applications such as multiplexing and demultiplexing.

Although the integrated optics approach to polarization converters promises to be useful for many applications, there are other applications in which it would be desirable to make an optical fiber a part of the polarization converter. Such converters can be termed in-line rotators or converters. The fibers used in this type of converter will necessarily be single mode fibers. In practice, many optical fibers, either deliberately or through variations in manufacturing processes, exhibit optical birefringence as one of the principal fiber axes has an effective index of refraction different from that of the other principal axis. Thus, in-line optical fiber polarization converters are conceptually feasible. In such converters, polarization conversion occurs by a type of phase-matched coupling similar to that in the planar waveguide electro-optic mode converter previously discussed.

One single mode fiber optical polarization rotator is described in *Applied Optics*, 18, pp. 1857–1861, June 1, 1979. The approach described in this article uses a birefringent single mode optical fiber and mechanically twists the fiber in alternating directions on successive half wave fiber sections, i.e., it uses externally induced stresses. The authors believed that the operative mechanism resulting in polarization conversion was not only the fiber birefringence but also optical activity induced by the mechanical twists. See, also, U.S. Pat. No. 4,341,442 issued on July 27, 1982 which describes an optical filter using a twisted birefringent optical fiber.

Another approach uses Faraday rotation in birefringent optical fibers and is described in *Applied Optics*, 19, pp. 842–845, Mar. 15, 1980, by R. H. Stolen and E. H. Turner. This paper demonstrated that Faraday rotation in optical fibers can be obtained by using, for example, alternating regions of magnetic field. Other techniques, such as periodically spaced magnetic field regions, were also described.

Another single mode fiber filter is described in *Optics Letters*, 5, pp. 142–144, April 1980. Construction of a filter by cutting and splicing birefringent fiber lengths to achieve the desired retardation of one polarization with respect to the other is disclosed. A tunable filter embodiment is also suggested using externally induced stresses such as those already described. The authors believed that the twist produced optical activity or circular birefringence.

Another optical fiber filter which is based upon refractive index variations in the fiber is described in *Applied Physics Letters*, 32, pp. 647–649, May 15, 1978. A tunable filter was formed within the optical fiber by light induced refractive index changes in a silica core doped with germania.

The in-line fiber polarization rotators are often preferred at the present time to the integrated optic polarization rotators because they have less loss as they are fabricated from less lossy compositions than are the integrated optic devices and there are fewer reflections at the interfaces. Perhaps even more significantly, in-line rotators can theoretically be fabricated in very compact embodiments. However, the in-line fiber polarization rotators described are generally not totally satisfactory for all applications because external means are required to produce desired polarization conversion and these means are difficult to fabricate in a uniform manner or the fiber must be cut into sections which are then joined together after rotation.

SUMMARY OF THE INVENTION

We have found that an optical device comprising a birefringent single mode optical fiber having periodic perturbations that are an integral part of the fiber, such as twists of the fiber's principal axes, has advantageous applications such as, for example, an in-line fiber polarization rotator. The repeat distance of the periodic perturbations is approximately equal to the birefringence beat length, and cumulative conversion from one principal axis to the other occurs. The optical device may also be used as a narrow band filter. In another embodiment, the device is used as a tunable filter with tunability of the filter being obtained by, for example, stretching the fiber to change the birefringence. A tunable filter is advantageously employed in demultiplexing applications as the undesired channels are unattenuated by the polarization conversion device.

DETAILED DESCRIPTION

Figure 1:
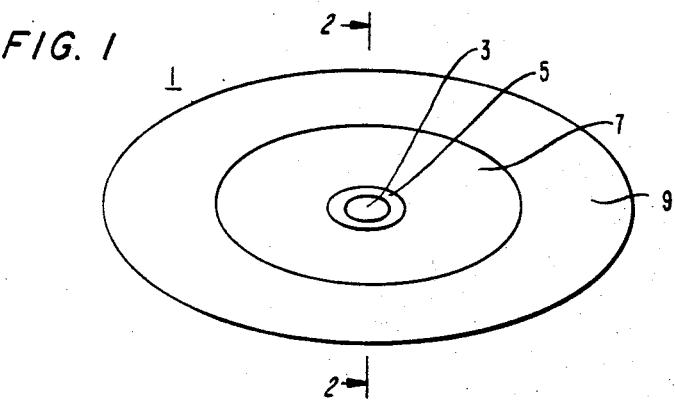
FIG. 1 is a schematic representation of a cross-sectional view of a typical birefringent optical fiber.

FIG. 1 is a sectional view of an exemplary single mode birefringent fiber which is useful as, for example, an in-line fiber polarization rotator according to this invention. The fiber, indicated generally as 1, comprises core 3, stress cladding 5, outer cladding 7, and substrate 9. The relationship between the core diameter and the refractive index difference between core and clad that must be satisfied for single mode propagation is well known to those skilled in the art and need not be further described. In the embodiment depicted, the core is highly stressed by the cladding and accordingly, the fiber is birefringent. It should be noted that the stress cladding is elliptical in shape and that the stress on the core is not symmetric with respect to rotations about the fiber's longitudinal axis. Accordingly, the fiber is birefringent.

Other types of birefringent single mode fibers may be used. For example, the core may be stressed by two stress regions which are 180 degrees apart and spaced from the core. It is thus not essential that the stress region be a cladding. The stress regions, clad or otherwise, have a different coefficient of thermal expansion than does the core, and as the fiber is cooled after drawing from the preform, apply an asymmetric stress to the core which causes birefringence. Additionally, optical fibers having an elliptical core may also be used as they exhibit geometrical birefringence. Although the compositions are unstressed, the effective refractive indices for two orthogonal directions are different. Hence, the origin of the term geometrical birefringence.

Figure 2:
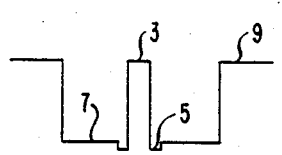
FIG. 2 plots the variation in refractive index across a section of the birefringent optical fiber depicted in FIG. 1.

FIG. 2 shows the refractive index variation across the axis of the fiber, indicated generally as 2—2 depicted in FIG. 1, with the refractive index plotted vertically for the various fiber regions. As can be seen, the core has a relatively high refractive index and is surrounded by clads of lower refractive index and the substrate of relatively high refractive index. In one embodiment, the fiber comprised a silica core, an elliptical borosilicate stress cladding and a fluorosilicate outer cladding. The substrate comprised silica. The fiber was round with a diameter of 124 $\mu$m and supported only the fundamental mode for wavelengths longer than 560 nm. As has been described, other fiber configurations and compositions may be used.

Figure 3:
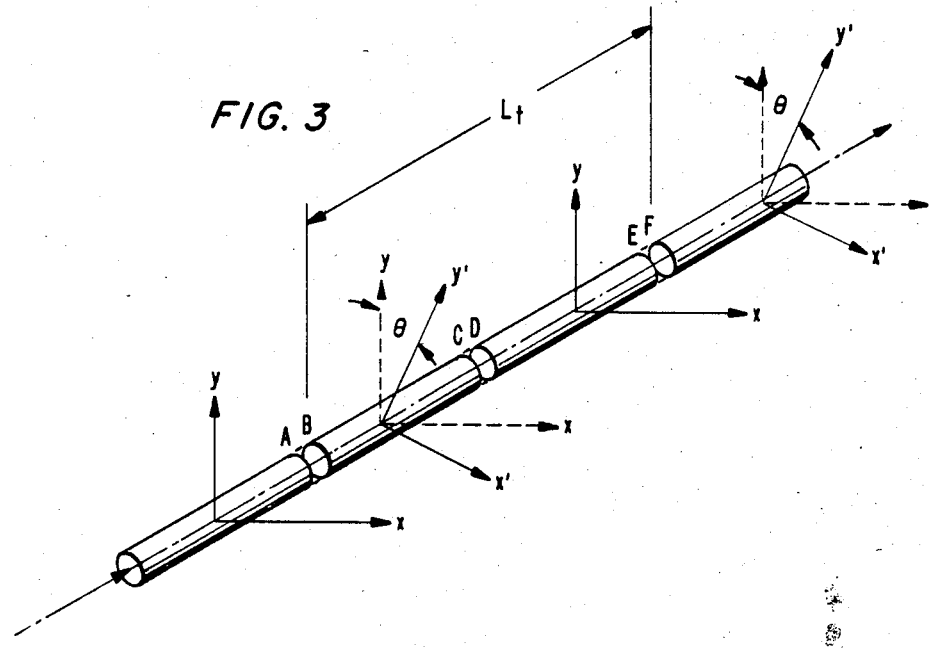
FIG. 3 depicts a schematic representation of a fiber polarization rotator according to this invention.

The fiber is not symmetric under translation along the longitudinal axis of the fiber but has periodic perturbations, such as twists of the fiber's principal axes through an angle about the longitudinal axis of the fiber, that are an integral part of the fiber. Integral is used to mean that external stresses or fiber splices are not used to form the periodic perturbations, i.e., these perturbations are a part of the fiber. The period of the perturbation is equal to the birefringence beat length. It is understood that because the beat length varies with frequency, this means that the condition is satisfied for at least one frequency. Successive twists are in alternating directions. This is more easily understood by reference to FIG. 3 which is a schematic perspective view of a fiber according to our invention. Although the twists are depicted and will be described as abrupt, it is to be understood that they may also be, and in a preferred embodiment are, gradual. However, it is believed that explanation of devices according to our invention will be facilitated by reference to abrupt twists. The direction of the propagating electromagnetic wave is indicated by the arrows. The principal axes of the fiber are indicated as x and y. The fiber has an abrupt twist through an angle $\theta$ between points A and B and is twisted back in the opposite direction by same angle between points C and D. The principal axes after the first twist are indicated as x' and y'. The process repeats beginning at points E and F with the positions of the principal axes again being indicated as x' and y'. The full twist period, i.e., the fiber between points A and E, is designated by $L_t$. The period, $L_t$, should be equal to the beat length, $L_B$, which is equal to $\lambda/\delta n$, where L is the vacuum wavelength and $\delta n$ is the refractive index difference between the two principal axes. In practice, small deviations from equality may occur. It will be understood by those skilled in the art, that this condition will be generally satisfied for only a single wavelength.

The operation of the device depicted will be better understood from the following considerations. Light initially polarized along the y axis at point A does not follow the twist and at point B, both principal polarization axes of the fiber are excited. If the length of section B-C is one-half the birefringence length, the state of polarization at point C is again linear but is reflected through the new y axis by an angle $\theta$. The fiber is twisted back between C and D to its original orientation so that at point D the direction of linear polarization of the electromagnetic wave has been rotated by an angle $2\theta$ with respect to its initial orientation. After the distance D-E, which is also a half beat length, the polarization is again linear and reflected through the y axis. The twist between E and F also adds to the net rotation. After N full beat lengths, the net rotation is $N\theta$. This results in a net conversion from the y axis to the x axis of:

$$p_x = p_0 \sin^2 2N\theta$$

and $$p_y = p_0 \cos^2 2N\theta.$$

The cumulative addition of the rotations per section at the wavelength for which $L_t$ equals $L_B$ is equivalent to phase matching. For other wavelengths at which $L_t$ is not equal to $L_B$, there will be increasing interference and cancellations of the contributions from successive sections. Accordingly, the net conversion is reduced.

It will also be apparent that since complete conversion from one axis to the other is typically desired, the choices of N and $\theta$ are related. More than one choice of N is possible for such conversion. The choice of N, as will be discussed, also determines the bandwidth of the device with larger values leading to a narrower bandwidth.

The axis rotation in the actual fiber polarization rotator is distributed along the whole fiber so that $\theta$ becomes an effective angle and it is more appropriate to deal with a coupling coefficient K. The coupled-wave formalism, which is well known to those skilled in the art, can then be conveniently used to describe the rotator. The effect of each full twist period $L_t$ on the electric field is described by a matrix, and maximum power transfer takes place when the off diagonal elements of the matrix are maximized.

For fiber rotators according to this invention, the birefringence is typically much greater than the coupling coefficient and the effective angle becomes $K/\delta$. In the same limit, $\delta$ is much greater than K and maximum power transfer is at the wavelength for which the beat length $L_p$ equals the twist period $L_t$. It should also be noted that at wavelengths sufficiently far from the peak power transfer point, the state of polarization is essentially unaffected by the filter. The bandwidth of these filters is approximately the inverse of the full number of period sections.

The periodic rocking of the polarization axes, i.e., the principal axes, is expediently accomplished during the fiber drawing process by oscillating the preform about its longitudinal axis. The frequency of oscillation will obviously be related to the speed of fiber drawing. However, slow drawing speeds and relatively low values of birefringence appear somewhat more advantageous than high speeds and high birefringence as they keep the oscillation frequency required for phase-matching from becoming very high and becoming difficult to implement.

The twist in the fiber depends not only on the drive amplitude of the preform oscillation but also on the furnace temperature. It is necessary that the temperature be sufficiently high so that a significant deformational twist takes place within a short distance from the hot zone. If the fiber is drawn at too low a temperature the fiber will be so stiff that the entire fiber oscillates along the preform and very little of the twist is incorporated into the fiber.

Figure 4:
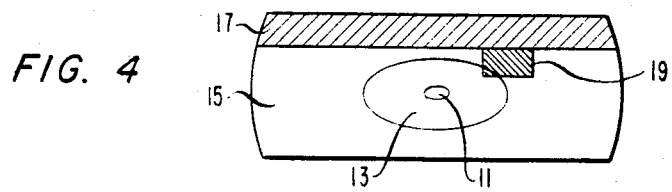
FIG. 4 depicts another fiber polarization rotator according to this invention.

Other embodiments of an in-line fiber rotator are also contemplated and one such embodiment is depicted in a sectional view in FIG. 4. The fiber comprises a core 11, stress region 13 and substrate 15. A portion 17 of the as-drawn fiber, indicated by the hatched line, has been removed to facilitate further device processing. The fiber might be termed a rectangular birefringent fiber and is generally similar to the fiber previously depicted except that a portion 17 of the fiber has been removed as shown. It should be noted that the removed material does not include any of the core or stressed region so that propagation of an electromagnetic wave through the core is not disturbed. The material may be removed by any of several well-known techniques such as etching, polishing, or sand-blasting, etc. Some additional material, indicated as the crossed-hatched region 19, is now removed to form a recess. This material includes part of the stress region on one side of the fiber. Although only one recess is shown, material is removed in this manner periodically at a distance with a period equal to that of the beat wavelength. The removal of the upper portion perturbs the angle of the principal axes a small amount because the forces acting on the fiber core are no longer symmetric. The amount of material removed is related to the magnitude of the perturbation with a greater depth resulting in a greater perturbation. The amount of the perturbation of the principal axes need be only a fraction of a degree to give a significant perturbation. Those skilled in the art will readily ascertain the amount of material that needs to be removed.

Although the removed material also alters the fiber birefringence, this adverse effect may be accounted for by tension or temperature in the device, i.e., the tension on or temperature of the fiber in the device may be varied. Alternatively, the fiber design might be changed. Periodic removal of material along the fiber may be expediently accomplished by masking the surface of the fiber and then either etching or sand-blasting the fiber to the required depth. If etching is used, photo-resists may be used as a mask. If sand-blasting is used, a metal plate with etching holes may be used as a mask. It will be readily appreciated that the operation of the fiber as a polarization rotator may be monitored during this removal step.

Figure 5:
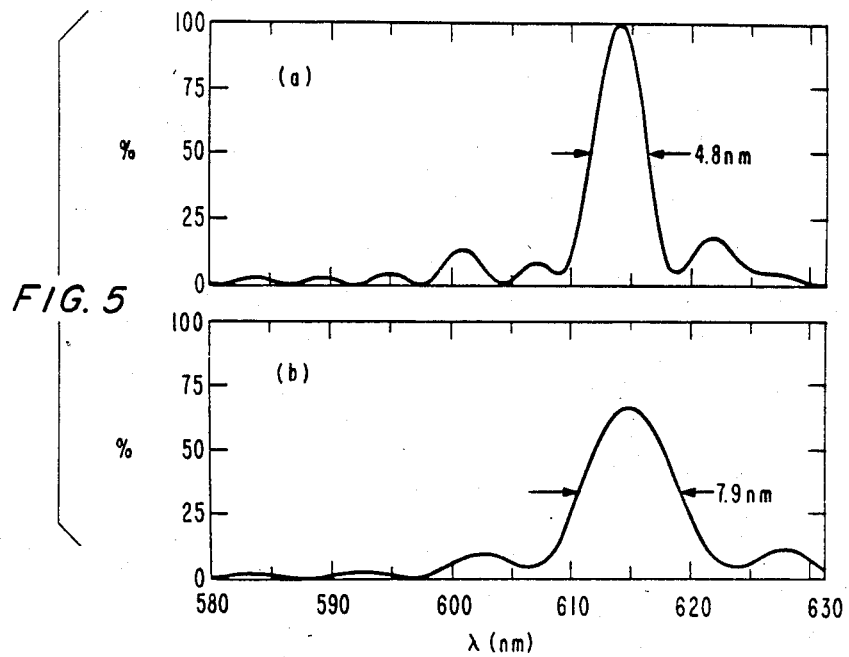
FIG. 5 plots the power converted from one principal axis to the orthogonal axis for devices according to this invention with two fiber lengths.

The wavelength dependence of the power conversion from one principal axis to the other was studied in an actual device using a tunable dye laser. The fiber used for the device was round with a diameter of 124 $\mu$m and supported only the fundamental mode for wavelengths longer than 560 nm. The core was silica and the stress and outer cladding were borosilicate and fluorosilicate, respectively. The twist period was 1.48 cm and the fiber birefringence, expressed as an index difference, was $4.04 \times 10^{-5}$. The dye laser was pumped by an argon ion laser and could be tuned over the wavelength range between 550 and 630 nm. The principal axes of the fiber input were oriented to match the direction of linear polarization of the dye laser. An input polarizer permitted fine adjustment of the input polarization. Measurements were made with an output polarizer set both along and perpendicular to the input polarization axes. The fiber was also positioned to avoid sharp bends which would modify the local birefringence due to stress. FIG. 5 shows the transmission spectra for a fiber polarization rotator for two different fiber lengths. The wavelength is plotted horizontally in units of nm and the conversion efficiency is plotted vertically in percent. Curve (a) shows the conversion efficiency for a fiber length of 170 cm while curve (b) is for a fiber length of 100 cm. The wavelength of maximum conversion is 613.7 nm and the half power bandwidth is 4.8 nm for the fiber of curve (a) while the shorter fiber of curve (b) has a lesser conversion efficiency and a half power bandwidth of 7.9 nm. The peak wavelength is also shifted 0.5 nm for curve (b). It should be noted that the bandwidths vary, as expected, with the number of periods. Exceeding the length required for 100 percent conversion leads to a decrease in peak conversion, an increase in the side maxima and a narrowing of the spectral features.

The angle of rotation of the principal axes can be estimated because $2N\theta = \tau/2$ for 100 percent conversion. The actual twist is approximately sinusoidal so that the angle is between 0.4 degrees and 0.6 degrees for abrupt and uniform twists, respectively.

The wavelength of maximum conversion can be tuned by changing the temperature or by axially stretching the fiber. These changes will alter the birefringence characteristics of the fiber and thus change the birefringence beat length.

Figure 6:
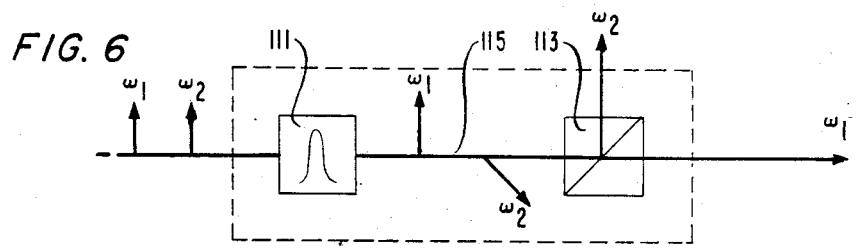
FIGS. 6 and 7 are schematic representations of two devices according to this invention using polarization rotators.

FIG. 6 depicts one optical device according to this invention. The device depicted comprises polarization rotator 111 and polarization splitter 113 which are optically coupled to each other by means of, for example, graded index lens 115. Other coupling means could also be used. Radiation at frequencies indicated as $\omega_1$ and $\omega_2$ is incident on the rotator through, for example, a length of optical fiber. The polarization states are indicated by the arrows. The polarization state of the radiation at the second frequency, $\omega_2$, is rotated through 90 degrees while the polarization state of radiation at the first frequency, $\omega_1$, is unaltered. When the radiation is incident on the polarization splitter 113, one wavelength, $\omega_1$, is transmitted and the second, $\omega_2$, is separated out as indicated. Polarization splitters are well known to those skilled in the art and need not be further described.

Figure 7:
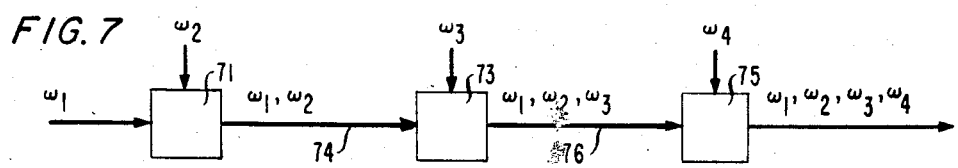

FIG. 7 depicts a schematic representation of a multiplexer according to our invention. The multiplexer includes optical devices 71, 72 and 73 according to this invention. Devices 71 and 73 as well as 73 and 75 are coupled together optically by means 74 and 76, respectively. Means 74 and 76 may be, for example, optical waveguides or optical fibers. The light incident on 71 is indicated as $\omega_1$. Light indicated as $\omega_2$ is also incident upon device 71. Means, such as optical fibers, may be to introduce the radiation to the devices at a plurality of frequencies. When the phase-matching condition is satisfied for $\omega_2$, radiation at that frequency will also be coupled into the device and multiplexing occurs. The operation of devices 73 and 75 with respect to the radiation indicated as $\omega_3$ and $\omega_4$ is similar. It will be appreciated by those skilled in the art that if the direction of all arrows is reversed, demultiplexing rather than multiplexing will occur. That is, device 75 separates the radiation at frequency $\omega_4$, etc.

Other methods of making in-line fiber filters in addition to rocking the preform during drawing are also contemplated. For example, a laser, such as a $CO_2$ laser emitting at 1.06 μm, may be focused on a short section of a fiber which has been hung vertically and attached to a pair of glass plates twisted with respect to each other. The fiber is locally heated to the softening point and the heat causes the fiber to soften and unwind. Because the fiber has been heated only locally, the twist will be totally relieved in the heated section and the fiber will remain straight above and below the heated region. It is apparent that a plurality of twists may be so generated.

It should also be noted that the twist length may be varied. Additionally, two rotators according to this invention may be coupled by a drift length which may be a fiber without any perturbations. The period of the perturbations may be made as small as a fraction of a centimeter.

What is claimed is:

1. An optical device comprising a birefringent single mode optical fiber, said fiber having principal axes and periodic integral perturbations with the period of said perturbations being approximately equal to the birefringence beat length.

2. An optical device as recited in claim 1 in which said periodic perturbations comprise periodic rotations of the principal axes of said fiber.

3. An optical device as recited in claim 2 in which said periodic structural perturbations comprise rotations of the fiber through alternate directions.

4. An optical device as recited in claim 3 in which said rotations are abrupt.

5. An optical device as recited in claim 3 in which said rotations are gradual.

6. An optical device as recited in claim 2 in which said periodic structural perturbations comprise recesses in said fiber.

7. An optical device as recited in claim 2 further comprising a polarization splitter, said polarization splitter being optically coupled to said single mode fiber.

8. An optical device as recited in claim 2 further comprising a second birefringent single mode fiber, said second fiber having periodic interval perturbations with the period of said perturbations being approximately equal to the birefringent beat length, said first fiber being optically coupled to said second fiber.

9. An optical device as recited in claim 8 further comprising means for introducing radiation at a plurality of frequencies into said second optical fiber.

10. An optical device as recited in claim 9 further comprising means for changing said birefringence beat length of at least one of said fibers.

11. An optical device as recited in claim 2 further comprising means for introducing radiation at a plurality of frequencies into said optical fiber.

12. An optical device as recited in claim 2 further comprising means for changing said birefringence beat length.

13. An optical device as recited in claim 12 in which said means comprises means for changing the temperature of said device.

14. An optical device as recited in claim 13 in which said means comprises means for axially stretching said fiber.

15. A method of making an optical device comprising a birefringent optical fiber, said method comprising drawing said fiber from a preform and forming periodic integral perturbations in said optical fibers, the period of said perturbations being equal to the birefringence beat length.

16. A method as recited in claim 15 in which said periodic perturbations comprise periodic rotations of the principal axes of said fiber.

17. A method as recited in claim 16 in which said forming step is executed during said drawing.

18. A method as recited in claim 17 in which said forming step comprises rocking said preform during said drawing process.

19. A method as recited in claim 16 in which said fiber has a longitudinal axis and said forming step comprises locally heating said fiber and rotating said fiber about its longitudinal axis.

20. A method as recited in claim 16 in which said fiber comprises a stress region and said forming step comprises making recesses in said fiber, said recesses extending into said stress region.

* * * * *